(12) United States Patent
Kang

(10) Patent No.: US 9,528,719 B2
(45) Date of Patent: Dec. 27, 2016

(54) COOLING BLOWER CONTROL DEVICE AND METHOD FOR HIGH-VOLTAGE BATTERY

(71) Applicants: Hyundai Motor Company, Seoul (KR); Kia Motors Corporation, Seoul (KR)

(72) Inventor: Min Kyeong Kang, Jeonbuk (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 1078 days.

(21) Appl. No.: 13/677,980

(22) Filed: Nov. 15, 2012

(65) Prior Publication Data

US 2014/0057547 A1    Feb. 27, 2014

(30) Foreign Application Priority Data

Aug. 23, 2012  (KR) .................. 10-2012-0092208

(51) Int. Cl.
*F24F 11/053*    (2006.01)
*F24F 11/00*    (2006.01)
(Continued)

(52) U.S. Cl.
CPC .......... *F24F 11/053* (2013.01); *B60L 11/1874* (2013.01); *F24F 11/0001* (2013.01);
(Continued)

(58) Field of Classification Search
CPC ............. Y02T 10/7005; Y02T 10/7044; Y02T 10/7283; Y02T 10/642; B60L 2240/545; B60L 2240/549; B60L 11/1861; B60L 11/1874; B60L 11/1879; B60W 20/26; B60W 20/11; B60W 20/00; B60W 2510/246; B60W 2710/246; H01M 10/613; H01M 10/625; H01M 10/633; H01M 10/6563; H01M 8/04992; F02D 41/1404; G06N 5/048; H02J 7/045; H02J 7/047; G05B 13/0275; G06F 1/206
See application file for complete search history.

(56) References Cited

U.S. PATENT DOCUMENTS 5,696,439 A * 12/1997 Presti .................. G05B 13/0275
                                              323/222
6,627,851 B2 * 9/2003 Sangwan .................. H05B 3/84
                                              219/203
(Continued)

FOREIGN PATENT DOCUMENTS

CN         101366144 A      2/2009
CN         101901920 A      12/2010
(Continued)

*Primary Examiner* — Crystal J Barnes-Bullock
(74) *Attorney, Agent, or Firm* — Mintz Levin Cohn Ferris Glovsky and Popeo, P.C.; Peter F. Corless

(57) ABSTRACT

Disclosed is a cooling blower control device and method for a high-voltage battery, by which a cooling blower used in a high-voltage battery is efficiently controlled using fuzzy control. To this end, the cooling blower control device includes a temperature (or first) sensor configured to sense an internal temperature of a battery pack assembly, and a current sensor configured to sense an output current of the battery pack assembly. A fuzzy controller performs fuzzy control by using outputs of the temperature sensor and the current sensor as inputs to output a cooling blower's duty ratio, and a pulse-width modulation (PWM) controller performs PWM control by using an output of the fuzzy controller as an input to output a control signal for driving the cooling blower.

11 Claims, 8 Drawing Sheets

(51) Int. Cl.
| | |
|---|---|
| H01M 10/613 | (2014.01) |
| H01M 10/633 | (2014.01) |
| B60L 11/18 | (2006.01) |
| G05B 13/02 | (2006.01) |
| H01M 8/04 | (2016.01) |
| G06F 1/20 | (2006.01) |
| G06N 5/04 | (2006.01) |
| H01M 10/48 | (2006.01) |
| H01M 10/6563 | (2014.01) |

(52) U.S. Cl.
CPC ........ *F24F 11/006* (2013.01); *G05B 13/0275* (2013.01); *G06F 1/206* (2013.01); *G06N 5/048* (2013.01); *H01M 8/04992* (2013.01); *H01M 10/486* (2013.01); *H01M 10/613* (2015.04); *H01M 10/633* (2015.04); *H01M 10/6563* (2015.04); *B60W 2510/246* (2013.01); *B60W 2710/246* (2013.01)

(56) References Cited

U.S. PATENT DOCUMENTS

| | | | | |
|---|---|---|---|---|
| 6,651,759 B1* | 11/2003 | Gruenwald | ............ | B60K 6/28 180/65.245 |
| 6,735,499 B2* | 5/2004 | Ohki | ............ | G06F 1/206 361/679.31 |
| 7,832,511 B2* | 11/2010 | Syed | ............ | B60K 6/365 180/65.1 |
| 8,054,039 B2* | 11/2011 | Bauerle | ............ | B60L 3/003 320/109 |
| 8,219,248 B2* | 7/2012 | Aridome | ............ | B60K 6/445 123/41.02 |
| 8,506,021 B2* | 8/2013 | Moon | ............ | B60T 8/174 303/20 |
| 8,719,195 B2* | 5/2014 | Frisch | ............ | G01R 31/3679 320/137 |
| 8,818,595 B2* | 8/2014 | Tamagawa | ............ | B60K 6/442 180/65.285 |
| 8,917,051 B2* | 12/2014 | Thornton | ............ | H01M 8/04373 320/101 |

FOREIGN PATENT DOCUMENTS

| | | |
|---|---|---|
| CN | 102324590 A | 1/2012 |
| JP | 08308018 A | 11/1996 |
| JP | 2001526827 A | 12/2001 |
| JP | 2002-151166 A | 5/2002 |
| JP | 2003-111291 A | 4/2003 |
| KR | 1020010009021 A | 2/2001 |
| KR | 10-0836391 | 6/2008 |
| KR | 1020120067520 A | 6/2012 |
| WO | 95/01594 A1 | 1/1995 |
| WO | 9840925 A1 | 9/1998 |
| WO | 03071617 A3 | 11/2003 |

\* cited by examiner

COOLING BLOWER CONTROL DEVICE AND METHOD FOR HIGH-VOLTAGE BATTERY

CROSS-REFERENCE TO RELATED APPLICATION

This application claims under 35 U.S.C. §119(a) the benefit of Korean Patent Application No. 10-2012-0092208 filed on Aug. 23, 2012, the entire contents of which are incorporated herein by reference.

BACKGROUND (a) Technical Field

The present invention relates to a cooling blower control device and method for a high-voltage battery, and more particularly, to a cooling blower control device and method for a high-voltage battery, by which a cooling blower used in a high-voltage battery is efficiently controlled via fuzzy control.

(b) Background Art

Generally, in hybrid vehicles, a cooling blower is used to reduce heat generated in driving of a high-voltage battery. As shown in FIG. 1, a conventional high-voltage battery cooling blower control device drives a cooling blower according to pulse-width modulation (PWM) control which senses a temperature of a battery pack assembly (BPA), determines an operating level of the cooling blower according to the sensed temperature, and uses the determined operating level as an input.

By nature of a high-voltage battery having high power output, in high-rate discharging, driving of the cooling blower is necessary with respect to heat emission of each battery cell. According to the conventional high-voltage battery cooling blower control method, due to a structure of the BPA, heat emitted from each battery cell is difficult to detect by a temperature sensor, and as a result the heat emission of the battery cell is effectively not considered.

That is, although about 16 temperature sensors are generally provided in a BPA, operations of the cooling blower cannot be effectively controlled due to inaccurate temperature values measured by the temperature sensors. Moreover, since the operating level of the cooling blower is simply determined based on a temperature value in the BPA and the cooling blower is driven according to the determined operating level, heat emission from the battery cell cannot be handled dynamically. For example, when the temperature in the BPA reaches 26° C., if the cooling blower for the high-voltage battery is configured to be operated using only one value or setting, the cooling blower would not turn on even if the temperature in the BPA is kept at 25.9° C.

SUMMARY OF THE DISCLOSURE

Accordingly, the present invention has been made to solve the foregoing problem, and provides a cooling blower control device and method for a high-voltage battery, by which fuzzy control is used to control a cooling blower used in a high-voltage battery of a hybrid vehicle, making dynamic and effective control possible.

According to an aspect of the present invention, there is provided a cooling blower control device for a high-voltage battery, the cooling blower control device including a temperature sensor (or first sensor) configured to sense an internal temperature of a battery pack assembly, a current sensor (or second sensor) configured to sense an output current of the battery pack assembly, a controller configured to perform fuzzy control by using outputs of the temperature sensor and the current sensor as inputs to output a cooling blower's duty ratio, and a pulse-width modulation (PWM) controller configured to perform PWM control by using an output of the fuzzy controller as an input to output a control signal for driving the cooling blower.

Preferably, the fuzzy controller may include a fuzzifier that is configured to receive the outputs from the temperature sensor and the current sensor as inputs and convert them into values corresponding to membership degrees of respective input membership functions, a fuzzy reasoning unit configured to receive outputs of the fuzzifier as inputs, perform fuzzy reasoning by using a rule base, and reason or determine outputs, and a defuzzifier configured to convert the cooling blower's duty ratio into a general constant by using a Mamdani reasoning method which uses membership degrees corresponding to the outputs of the fuzzy reasoning unit as rounding-down criteria for respective output membership functions.

According to another aspect of the present invention, there is provided a cooling blower control method for a high-voltage battery, the cooling blower control method including sensing, by a first sensor, an internal temperature of a battery pack assembly, sensing, by a second sensor, an output current of the battery pack assembly, performing, by a first controller, fuzzy control by using an internal temperature and an output current of the battery pack assembly as inputs to determine a cooling blower's duty ratio, and drive, by a second controller, a cooling blower by performing pulse-width modulation (PWM) control which uses the cooling blower's duty ratio as an input.

Herein, the performing of the fuzzy control may include a fuzzification step of receiving the internal temperature and the output current of the battery pack assembly as inputs and converting the inputs into values corresponding to membership degrees of respective input membership functions, a fuzzy reasoning step of receiving outputs of the fuzzification step as inputs, performing fuzzy reasoning by using a rule base, and reasoning/determining outputs, and a defuzzification step of converting the cooling blower's duty ratio into a general constant via a Mamdani reasoning method which uses membership degrees corresponding to the outputs of the fuzzy reasoning step as rounding-down criteria for respective output membership functions.

BRIEF DESCRIPTION OF THE DRAWINGS

The above and other features of the present invention will now be described in detail with reference to an exemplary embodiment thereof illustrated the accompanying drawings which are given hereinbelow by way of illustration only, and thus are not limitative of the present invention, and wherein.

DETAILED DESCRIPTION

Figure 1:
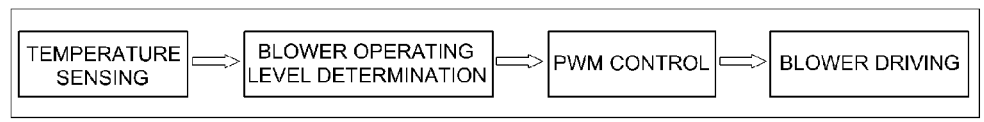
FIG. 1 is a flowchart showing a conventional cooling blower control method for a high-voltage battery.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Although the below exemplary embodiments are described as using a plurality of units/controllers to perform the above process, it is understood that the above processes may also be performed by a single controller or unit.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, the present invention will be described in detail with reference to the accompanying drawings to allow those of ordinary skill in the art to easily carry out the present invention.

The present invention relates to a cooling blower control device and control method for a high-voltage battery used in a hybrid vehicle, and provides an effective and practical cooling blower control device and method which uses a fuzzy control method and a current sensor in a power relay assembly (PRA), rather than merely depending on only an atmospheric temperature.

As is well understood by those skilled in the art, fuzzy control makes it possible to mathematically generate a control process that is more closely related to human languages and thoughts. That is, fuzzy control is typically thought of as a mathematical system that analyzes analog input values in terms of logical variables that take on continuous values between 0 and 1, in contrast to classical or digital logic, which operates on discrete values of either 1 or 0 (true or false, respectively). Therefore, allow for a more dynamic control, much like the human thought process. For example, in traditional control, a cooling blower is driven only when a temperature exceeds a predetermined value or limit; whereas in fuzzy control, the cooling blower may be driven merely if a temperature is "high."

Generally, fuzzy control fuzzifies an input value, performs fuzzy reasoning, and converts an output value into a general constant through defuzzification. In the present invention, through fuzzy control, an input value (or a control input signal) for PWM control is generated and a cooling blower is driven, allowing more dynamic and efficient control of the cooling blower than in a conventional scheme.

In the present invention, the cooling blower is controlled, taking account of an output current of a battery pack assembly, making it possible to more effectively drive the cooling blower based on heat emission of a battery cell during a high-rate discharging.

Figure 2:
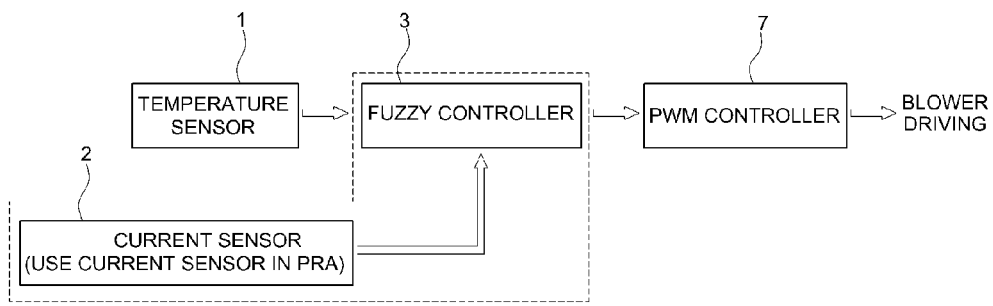
FIG. 2 is a block diagram of an exemplary cooling blower control device for a high-voltage battery according to an exemplary embodiment of the present invention.

As shown in FIG. 2, a cooling blower control device for a high-voltage battery according to the exemplary embodiment of the present invention may include a temperature sensor (or first sensor) 1 that is configured to measure an internal temperature of a battery pack assembly (BPA), a current sensor (or second sensor) 2 configured to measure an output current of the BPA, a fuzzy controller (first controller) 3 configured to perform fuzzy control by using measurement values of the temperature sensor 1 and the current sensor 2 as inputs, and a PWM controller (or second controller) 7 for controlling PWM control by using an output of the fuzzy controller 3 as an input. The temperature sensor 1 and the current sensor 2 may be mounted at respective proper positions in the BPA.

Figure 3:
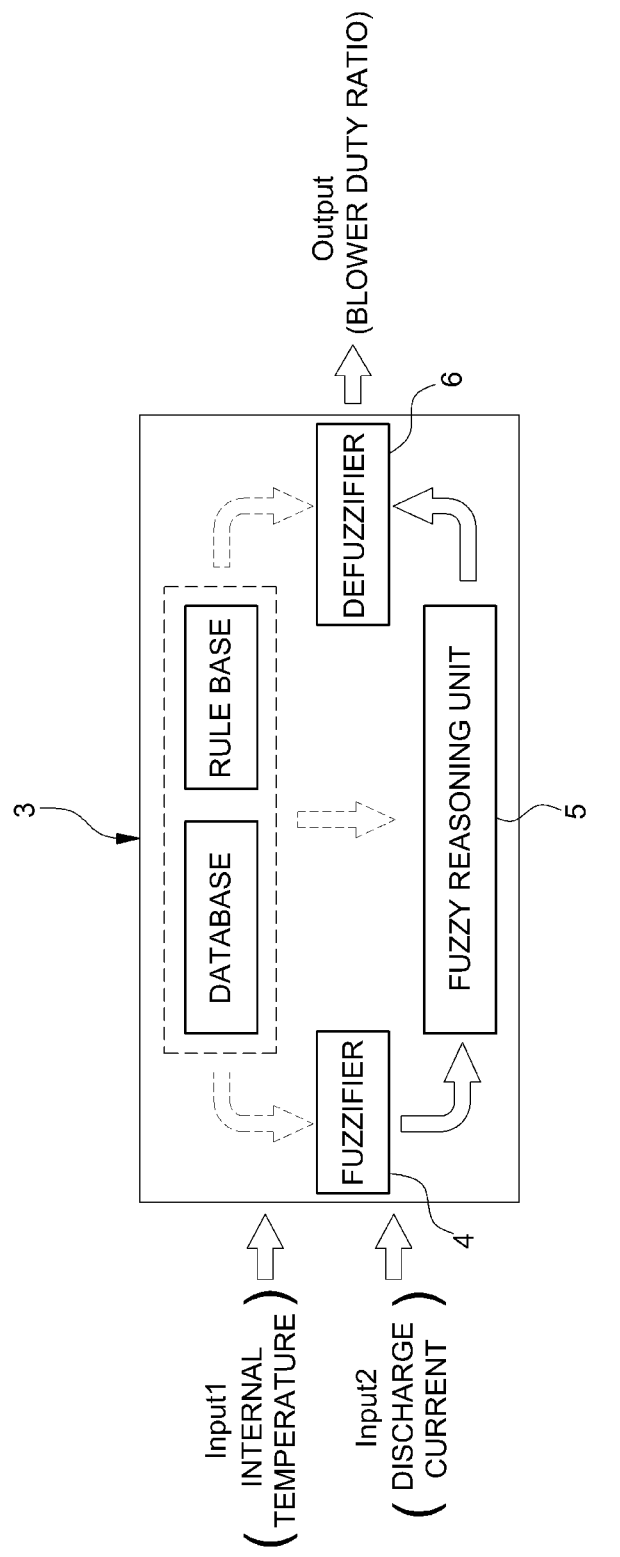
FIG. 3 is a block diagram of an exemplary fuzzy controller according to the exemplary embodiment of the present invention.

Referring to FIG. 3, the fuzzy controller 3 may include a fuzzifier 4 configured to fuzzify an input value to convert the input value into a fuzzy number, a fuzzy reasoning unit 5 configured to reason or determine an output value from the fuzzified input (fuzzy number) according to a rule base, and a defuzzifier 6 configured to apply a Mamdani reasoning method to the reasoned output values (fuzzy numbers) to convert them into a general constant.

The fuzzy controller 3 may configure a fuzzy set (membership function) having two inputs and one output for fuzzification. These two inputs may be an internal temperature and an output current of the BPA and one output may be a duty ratio of the cooling blower, that is, a drive output. The input and output of the fuzzy controller 3 may be assigned to a plurality of input membership functions and output membership functions according to ranges as shown in FIGS. 4A and 4B and FIG. 6.

Figure 4A:
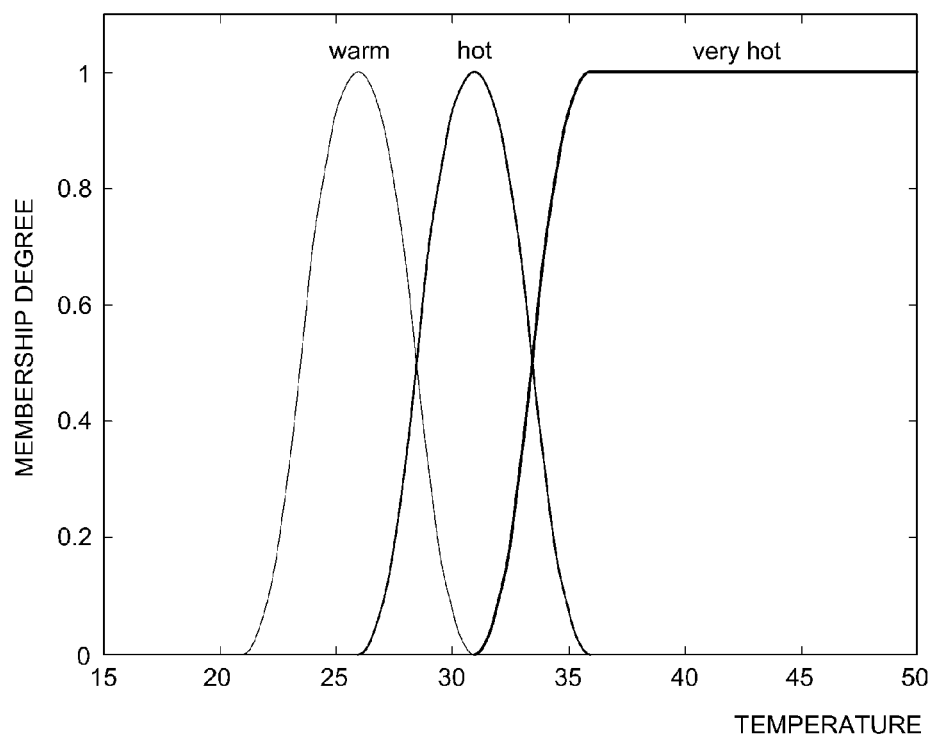
FIGS. 4A and 4B are graphical illustration showing exemplary input membership functions used as a database in a fuzzifier of the fuzzy controller according to the exemplary embodiment of the present invention.
Figure 4B:
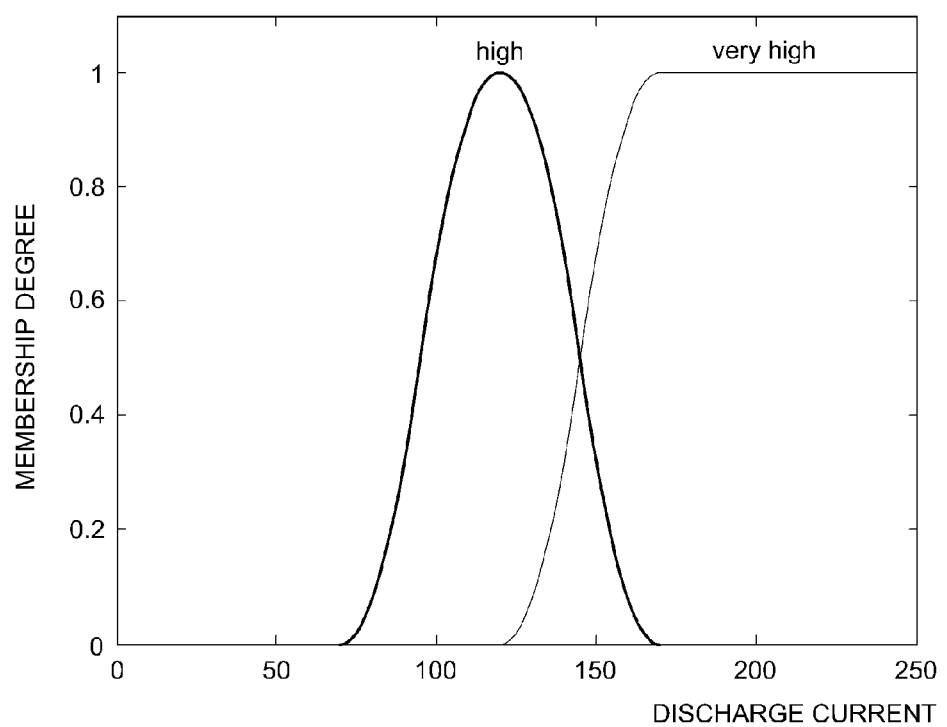
Figure 6:
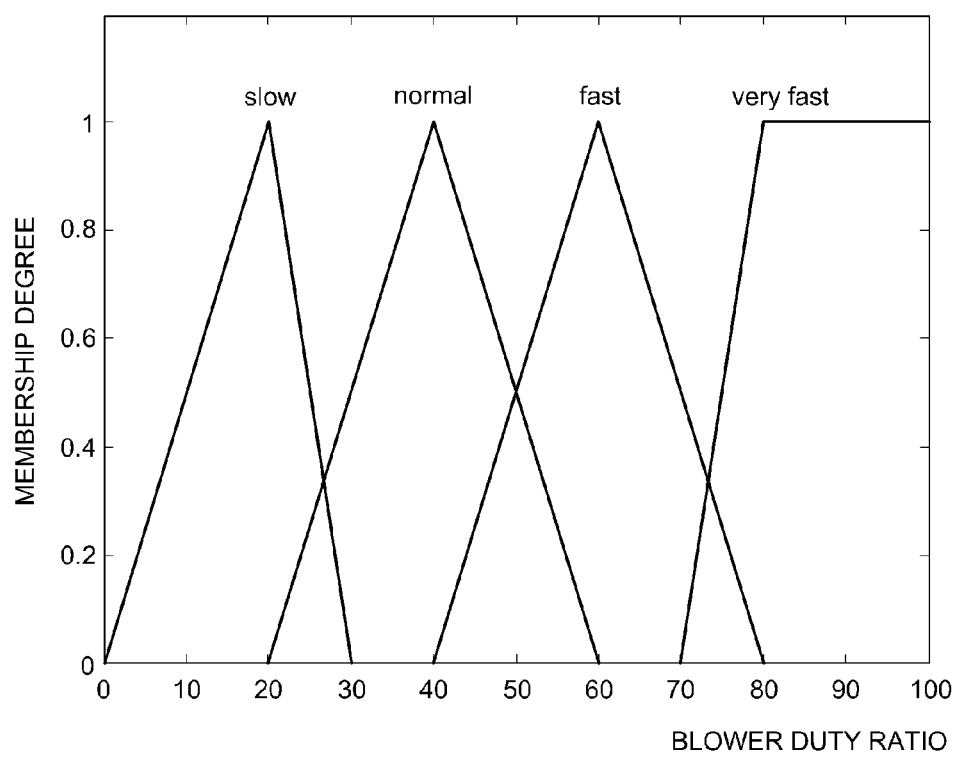
FIG. 6 is a graphical illustration showing an output membership function used as a database in a defuzzifier of a fuzzy controller according to the exemplary embodiment of the present invention.

That is, the internal temperature of the BPA may be assigned to three input membership functions as shown in FIG. 4A to indicate a membership degree for each membership function, the output current (discharge current) of the BPA is assigned to two input membership functions as shown in FIG. 4B to indicate a membership degree for each membership function, and a duty ratio of the cooling blower is assigned to four output membership functions as shown in FIG. 6 to indicate a membership degree for each membership function.

The input and output of the fuzzy controller 3 may be assigned to respective membership functions based on selection of different ranges for the respective membership functions, an overlapping region may be set differently for the respective membership functions, and the respective membership functions may be set as asymmetric functions.

The fuzzifier 4 may use the measurement values of the temperature sensor 1 and the current sensor 2, that is, the internal temperature and the output current (or discharge current) of the BPA, as crisp inputs, fuzzify the inputs or input values by using respective input membership functions to convert them into membership degrees or membership values, and output the membership degrees to the fuzzy reasoning unit 5. In other words, the fuzzifier 4 may receive the internal temperature and the output current (or discharge current) of the BPA as inputs to convert them into a fuzzy number (a membership degree), and use the input membership function as a database to convert the inputs as a fuzzy number.

The input membership function for fuzzification of the internal temperature and discharge current of the BPA may be shown as in FIGS. 4A and 4B. The internal temperature of the BPA is assigned to membership functions such as 'warm', 'hot', 'very hot', etc., according to classified temperature ranges according to temperature range as shown in FIG. 4A. All temperature values in each membership function has a membership degree (or membership value) as shown in FIG. 4A.

The discharge current of the BPA is assigned to membership functions such as 'high', 'very high', etc., according to classified current ranges as shown in FIG. 4B, in which all current values in each membership function have respective membership degrees.

As shown in FIGS. 4A and 4B, the internal temperature and discharge current of the BPA input to the fuzzifier 4 may belong to two sets (or membership functions) at the same time. For example, if the internal temperature of the BPA is 27° C., it may belong to the 'warm' and 'hot' membership functions at the same time; in this case, a membership degree with respect to the 'warm' membership function is very high and a membership degree with respect to the 'hot' membership function is very low.

If an input value belongs to two or more membership functions at the same time, the fuzzifier 4 outputs two values (a membership degree converted by respective membership function when input may be set as two input membership functions) to the fuzzy reasoning unit 5, and provides the membership functions to which the input value belongs and membership degrees with respect to those membership functions to the fuzzy reasoning unit 5 as inputs.

Respective membership functions (input membership functions) shown in FIGS. 4A and 4B may be classified into an S-type membership function and a π-type membership function; the S-type membership function may be expressed as Equation 1 and the π-type membership function may be expressed as Equation 2.

$$\mu_A(x) = \begin{bmatrix} 0 & x \leq a \\ 2\left[\dfrac{x-a}{c-a}\right] & a \leq x \leq b \\ 1-2\left[\dfrac{x-a}{c-a}\right] & b \leq x \leq c \\ 1 & c \leq x \end{bmatrix} \quad (1)$$

$$\mu'_A(x) = \begin{bmatrix} s\left(x, a'-b', \dfrac{a'-b'}{2}, a'\right) & x \leq a' \\ 1-s\left(x, a', \dfrac{a'+b'}{2}, a'+b'\right) & x \geq a' \end{bmatrix} \quad (2)$$

Figure 5A:
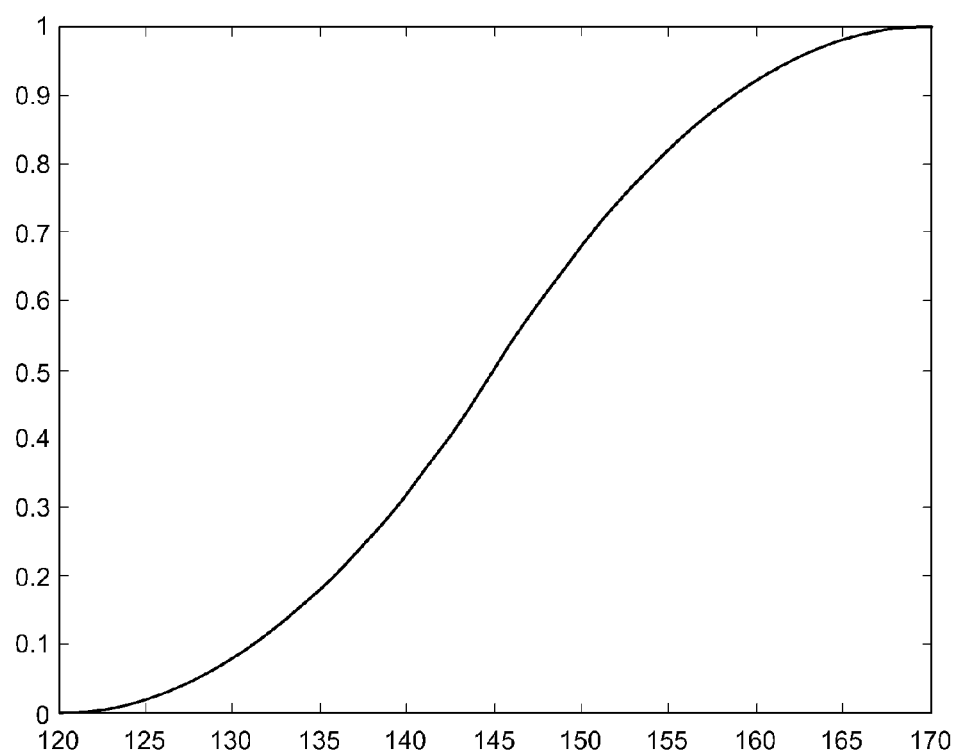
FIGS. 5A and 5B are graphical illustrations showing curved forms of an S-type membership function and a π-type membership function, respectively.

The S-type membership function has a curved form as shown in FIG. 5A, and in the S-type membership function, a, b, and c are constants which satisfy $\mu_A(a)=0$, $\mu_A(b)=0.5$, and $\mu_A(c)=1$, respectively.

Figure 5B:
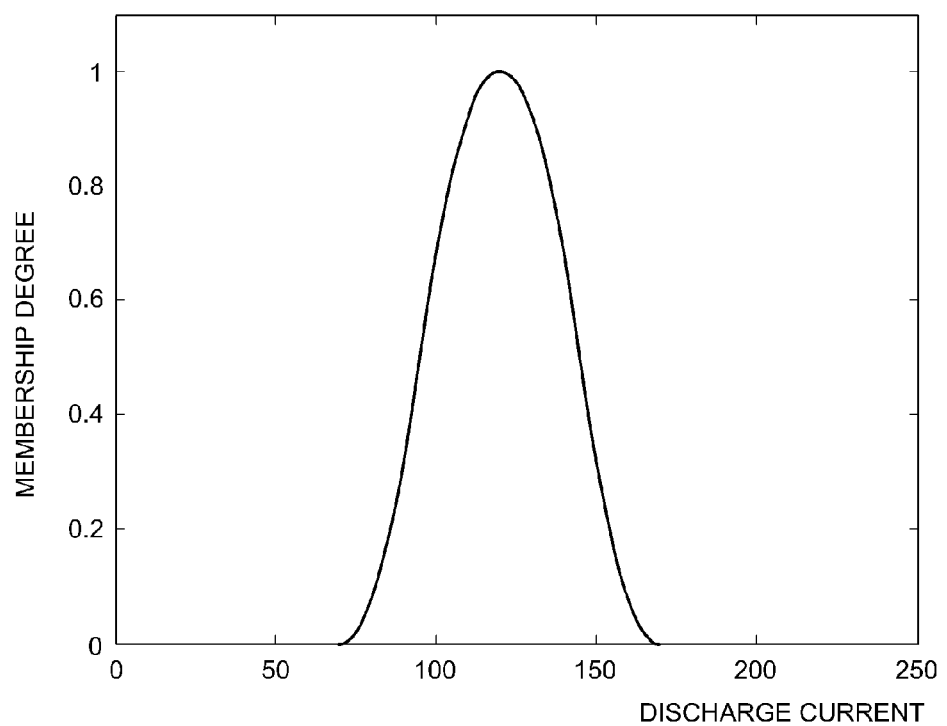

The π-type membership function has a curved form as shown in FIG. 5B, and in the π-type membership function, a' and b' are constants which satisfy $\mu'_A(a'-b')=0$, $\mu'_A(\{a'-b'\}/2)=0.5$, $\mu'_A(a')=1$, $\mu'_A(\{a'+b'\}/2)=0.5$, and $\mu'_A(a+b')=0$, respectively. An $s(x:\alpha,\beta,\gamma)$ function of $\mu'_A(x)$ is $\mu_A(x)$ which satisfies $\alpha=a$, $\beta=b$, and $\gamma=c$.

As described above, the fuzzy reasoning unit 5 reasons an output value from a fuzzified input value by using a rule base. More specifically, a membership function to which the internal temperature of the BPA belongs may be x and a membership function to which the discharge current of the BPA belongs may be y. Then, the rule base can be defined as below.

Rule 1. If x=warm, then drive the cooling blower slowly.
Rule 2. If x=hot, then drive the cooling blower normally.
Rule 3. If x=very hot, then drive the cooling blower fast.
Rule 4. If x=warm & y=high, then drive the cooling blower slowly.
Rule 5. If x=warm & y=very high, then drive the cooling blower normally.
Rule 6. If x=hot & y=high, then drive the cooling blower fast.
Rule 7. If x=hot & y=very high, then drive the cooling blower fast.
Rule 8. If x=very hot & y=high, then drive the cooling blower very fast.
Rule 9. If x=very hot & y=very high, then drive the cooling blower very fast.

Herein, the operator '&' with respect to x and y is processed as an intersection set to select a minimum value between the two values. For example, if, in Rule 6, a membership degree of an input value (internal temperature) belonging to the 'hot' membership function is 0.3 and an input value (discharge current) belonging to the 'high' membership function is 0.6, then a membership degree of a cooling blower duty ratio belonging to the 'fast' membership function is selected as a minimum value between the two values, that is, 0.3.

For the same output membership function, between two membership functions, one whose cooling blower duty ratio has the larger membership degree may be selected and processed. For example, if two fast membership functions are reasoned as output values of the fuzzy reasoning unit 5 and membership degrees of cooling blower duty ratios of the respective membership functions are 0.3 and 0.5, the membership degree of the cooling blower duty ratio for the 'fast' membership function is processed as the larger value, that is, 0.5.

The defuzzifier 6 converts the fuzzy output reasoned by the fuzzy reasoning unit 5, i.e., the output value (fuzzy number) into an equivalent crisp output, that is, a general constant to really use the output value, and uses an output membership function as a database. The output membership function classifies the cooling blower duty ratio into predetermined sections, e.g., the membership functions, 'slow', 'normal', 'fast', and 'very fast', as shown in FIG. 6.

The fuzzy reasoning unit 5 outputs at least one fuzzy output according to the internal temperature and the discharge current of the BPA, and upon input of the fuzzy output reasoned/determined by the fuzzy reasoning unit 5, the deffuzifier 6 integrates the fuzzy output by using a Mamdani reasoning method as well as the output membership functions to convert the fuzzy output into one general constant.

That is, the deffuzzifier 6 rounds down each of the output membership functions, 'slow', 'normal', 'fast', and 'very fast', to corresponding membership degrees according to the fuzzy output by using the Mamdani reasoning method to integrate them into one region (or operation) (see FIG. 7), and calculates a center of gravity $x_o$ with respect to an y axis (i.e., membership degree) of a resulting region (integration region formed as one region integrated through rounding down to a predetermined membership degree) according to a center-of-gravity method. The center of gravity is calculated by searching for a primary moment $G_y$ of a corresponding region and dividing the primary moment $G_y$ by an area A of the resulting region, as given by:

$$G_y = \int_A x\, dA = A \cdot x_0 \Rightarrow x_0 = \frac{G_y}{A}, \tag{3}$$

where $G_y$ is a primary moment, $x_o$ is a center of gravity, and A is an area of the resulting region.

The defuzzifier 6 outputs the center of gravity calculated by Equation 3 as an output (cooling blower duty ratio) to provide it to the PWM controller 7 as an input. The PWM controller 7 receives the output value (that is, the cooling blower duty ratio) converted into a general constant by the defuzzifier 6 as an input value (control signal) and performs PWM control with respect to the value. According to an output signal of the PWM controller 7, driving of the cooling blower is controlled.

The database and the rule base are defined based on expert's knowledge in a corresponding field. For example, by using the fuzzy controller 3 according to the present invention, the drive output of the cooling blower can be determined in the following manner.

When the internal temperature of the BPA is 27.428° C. and the discharge current (output current) is 140 A, the fuzzifier 4 converts the internal temperature of the BPA into a membership degree of 0.837 of the 'warm' membership function and a membership degree of 0.163 of the 'hot' membership function as shown in FIG. 4A, and provides them to the fuzzy reasoning unit 5. The fuzzifier 4 also converts the discharge current of the BPA into a membership degree of 0.68 of the 'high' membership function and a membership degree of 0.32 of the 'very high' membership function as shown in FIG. 4B, and provides them to the fuzzy reasoning unit 5.

A combination of four fuzzy inputs input to the fuzzy reasoning unit 5 satisfies Rules 4-7 of the rule base used by the fuzzy reasoning unit 5, and four corresponding fuzzy outputs are output to the defuzzifier 6. The four outputs are a membership degree of 0.837 of the 'slow' membership function, a membership degree of 0.32 of the 'normal' membership function, a membership degree of 0.163 of the 'fast' membership function, and a membership degree of 0.163 of the 'very fast' membership function.

Figure 7:
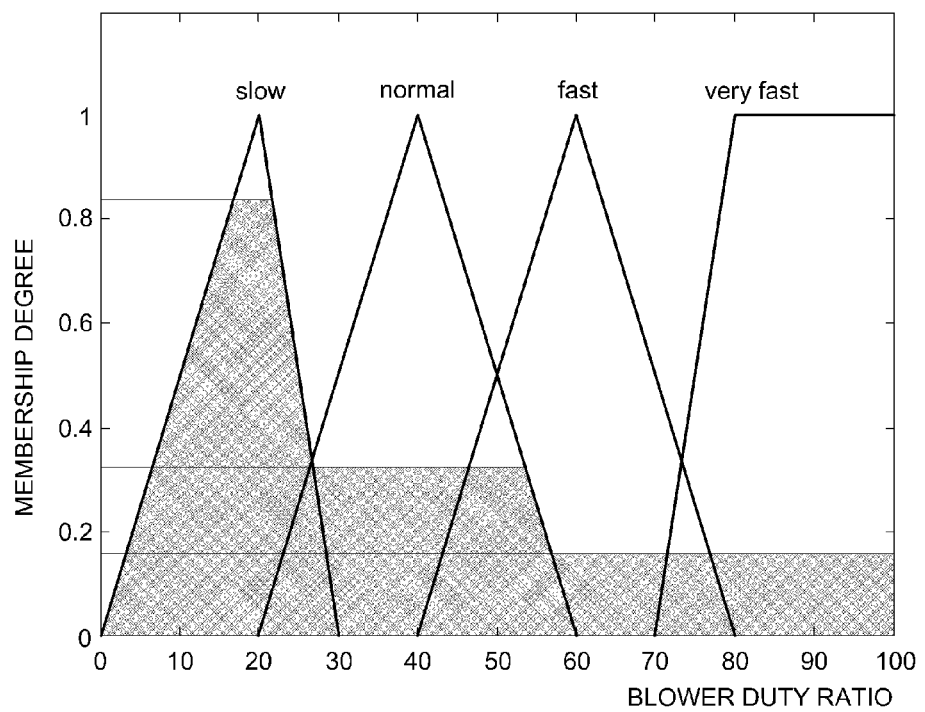
FIG. 7 is a graphical illustration showing an output membership function used as an example in a defuzzification step of fuzzy control by using the fuzzy controller according to the exemplary embodiment of the present invention.

The defuzzifier 6 rounds down the respective membership functions to membership degrees corresponding to the fuzzy outputs by using the Mamadani reasoning method as shown in FIG. 7 to integrate them into one region, and calculates the center of gravity $G_y$ for the region (see Equation 3) by using the center-of-gravity method. As a result, $G_y$=1169.11. In Equation 3, A is 30.56. Thus, the output of the defuzzifier 6 finally output from the fuzzy controller 3 is 38.26%.

As can be appreciated from the foregoing description, the cooling blower control device and method for a high-voltage battery according to the present invention controls the cooling blower used in the high-voltage battery by using fuzzy control, allowing more dynamic and effective control with respect to heat emission of a battery pack and thus lengthening the lifespan of a battery pack assembly when compared to a conventional control method which performs PWM control merely using a temperature value of the battery pack.

Moreover, the cooling blower control device and method for a high-voltage battery according to the present invention utilizes an output current value of the battery pack for control by using a current sensor in a power relay assembly (PRA) as well as fuzzy control, making practical control possible rather than simply depending on the atmospheric temperature of the battery pack.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

[Description of Reference Numerals]

| | |
|---|---|
| 1: Temperature Sensor | 2: Current Sensor |
| 3: Fuzzy Controller | 4: Fuzzifier |
| 5: Fuzzy Reasoning Unit | 6: Deffuzifier |
| 7: PWM Controller | |

What is claimed is:

1. A cooling blower control system for a high-voltage battery, the cooling blower control device comprising:
   a first sensor configured to sense an internal temperature of a battery pack assembly;
   a second sensor configured to sense an output current of the battery pack assembly;
   a first controller configured to perform fuzzy control by using outputs of the temperature sensor and the current sensor as inputs to output a cooling blower's duty ratio; and
   a second controller configured to perform pulse-width modulation (PWM) control by using an output of a fuzzy controller as an input to output a control signal for driving the cooling blower,
   wherein the first controller is the fuzzy controller which comprises:
      a fuzzifier configured to receive the outputs of the first sensor and the second sensor as inputs and converts the inputs into values corresponding to membership degrees of respective input membership functions;
      a fuzzy reasoning unit configured to receive outputs of the fuzzifier as inputs, perform fuzzy reasoning by using a rule base, and reason outputs; and
      a defuzzifier configured to convert the cooling blower's duty ratio into a general constant by using a Mamdani reasoning method which uses membership degrees corresponding to the outputs of the fuzzy reasoning unit as rounding-down criteria for respective output membership functions.

2. The cooling blower system of claim 1 wherein the output membership functions are classified into an S-type membership function and a π-type membership function.

3. The cooling blower control system of claim 2, wherein the S-type membership function is expressed as Equation 1 and the π-type membership function is expressed as Equation 2:

$$\mu_A(x) = \begin{bmatrix} 0 & x \leq a \\ 2\left[\dfrac{x-a}{c-a}\right] & a \leq x \leq b \\ 1 - 2\left[\dfrac{x-a}{c-a}\right] & b \leq x \leq c \\ 1 & c \leq x \end{bmatrix} \quad (1)$$

$$\mu'_A(x) = \begin{bmatrix} s\left(x, a'-b', \dfrac{a'-b'}{2}, a'\right) & x \leq a' \\ 1 - s\left(x, a', \dfrac{a'+b'}{2}, a'+b'\right) & x \geq a' \end{bmatrix} \quad (2)$$

wherein the S-type membership function has a curved form, and in the S-type membership function, a, b, and c are constants which satisfy $\mu_A(a)=0$, $\mu_A(b)=0.5$, and $\mu_A(c)=1$, respectively, and the π-type membership function has a curved form, and in the π-type membership function, a' and b' are constants which satisfy $\mu'_A(a'-b')=0$, $\mu'_A(\{a'-b'\}/2)=0.5$, $\mu'_A(a')=1$, $\mu'_A(\{a'+b'\}/2)=0.5$, and $\mu'_A(a'+b')=0$, respectively, and $s(x:\alpha,\beta,\gamma)$ function of $\mu'_A(x)$ is $\mu_A(x)$ which satisfies $\alpha=a$, $\beta=b$, and $\gamma=c$.

4. The cooling blower control system of claim 1 wherein a membership function to which the internal temperature belongs is x and a membership function to which the discharge current belongs is y.

5. The method of claim 4, wherein the rule base is defined as follows:
when x=warm, then drive the cooling blower is driven slower than normal,
when x=hot, then drive the cooling blower is driven normally,
when x=very hot, then drive the cooling blower is driven faster than normal,
when x=warm & y=high, then drive the cooling blower is driven slower than normal,
when x=warm & y=very high, then drive the cooling blower normally,
when x=hot & y=high, then drive the cooling blower faster than normal,
when x=hot & y=very high, then drive the cooling blower faster than normal, and
when x=very hot & y=high, then drive the cooling blower is driven at the cooling blower's fastest setting.

6. A cooling blower control method for a high-voltage battery, the cooling blower control method comprising:
sensing, a first sensor, an internal temperature of a battery pack assembly;
sensing, by a second sensor, an output current of the battery pack assembly;
performing, by a first controller, fuzzy control by using an internal temperature and an output current of the battery pack assembly as inputs to determine a cooling blower's duty ratio; and
driving, by a second controller, a cooling blower by performing pulse-width modulation (PWM) control which uses the cooling blower's duty ratio as an input,
wherein the performing of the fuzzy control comprises:
receiving, by the first controller, the internal temperature and the output current of the battery pack assembly as inputs and converting them into values corresponding to membership degrees of respective input membership functions a fuzzy outputs;
receiving, by the first controller, the fuzzy outputs as inputs, performing fuzzy reasoning by using a rule base, and reasoning outputs therefrom; and
converting, by the first controller, the cooling blower's duty ratio into a general constant by using a Mamdani reasoning method which uses membership degrees corresponding to the outputs of the fuzzy reasoning step as rounding-down criteria for respective output membership functions.

7. The method of claim 6 wherein the input membership functions are classified into an S-type membership function and a π-type membership function.

8. The method of claim 7, wherein the S-type membership function is expressed as Equation 1 and the π-type membership function is expressed as Equation 2:

$$\mu_A(x) = \begin{bmatrix} 0 & x \leq a \\ 2\left[\dfrac{x-a}{c-a}\right] & a \leq x \leq b \\ 1 - 2\left[\dfrac{x-a}{c-a}\right] & b \leq x \leq c \\ 1 & c \leq x \end{bmatrix} \quad (1)$$

$$\mu'_A(x) = \begin{bmatrix} s\left(x, a'-b', \dfrac{a'-b'}{2}, a'\right) & x \leq a' \\ 1 - s\left(x, a', \dfrac{a'+b'}{2}, a'+b'\right) & x \geq a' \end{bmatrix} \quad (2)$$

wherein the S-type membership function has a curved form, and in the S-type membership function, a, b, and c are constants which satisfy $\mu_A(a)=0$, $\mu_A(b)=0.5$, and $\mu_A(c)=1$, respectively, and then π-type membership function has a curved form, and in the π-type membership function, a' and b' are constants which satisfy $\mu'_A(a'-b')=0$, $\mu'_A(\{a'-b'\}/2)=0.5$, $\mu'_A(a')=1$, $\mu'_A(\{a'+b'\}/2)=0.5$, and $\mu'_A(a'+b')=0$, respectively, and $s(x:\alpha,\beta,\gamma)$ function of $\mu'_A(x)$ is $\mu_A(x)$ which satisfies $\alpha=a$, $\beta=b$, and $\gamma=c$.

9. The method of claim 6 wherein a membership function to which the internal temperature belongs is x and a membership function to which the discharge current belongs is y.

10. The method of claim 9, wherein the rule base is defined as follows:
when x=warm, then drive the cooling blower is driven slower than normal,
when x=hot, then drive the cooling blower is driven normally,
when x=very hot, then drive the cooling blower is driven faster than normal,
when x=warm & y=high, then drive the cooling blower is driven slower than normal,
when x=warm & y=very high, then drive the cooling blower normally,
when x=hot & y=high, then drive the cooling blower faster than normal,
when x=hot & y=very high, then drive the cooling blower faster than normal, and
when x=very hot & y=high, then drive the cooling blower is driven at the cooling blower's fastest setting.

11. A non-transitory computer readable medium containing program instructions executed by a controller, the computer readable medium comprising:
- program instructions that perform fuzzy control by using an internal temperature and an output current of the battery pack assembly received from a plurality of sensors as inputs to determine a cooling blower's duty ratio;
- program instructions that drive a cooling blower by performing pulse-width modulation (PWM) control which uses the cooling blower's duty ratio as an input;
- program instructions that convert the internal temperature and the output current of the battery pack assembly received from the plurality of sensors into values corresponding to membership degrees of respective input membership functions as fuzzy outputs;
- program instructions that the fuzzy outputs, perform fuzzy reasoning by using a rule base, and reason outputs therefrom; and
- program instructions that convert the cooling blower's duty ratio into a general constant by using a Mamdani reasoning method which uses membership degrees corresponding to the outputs of the fuzzy reasoning step as rounding-down criteria for respective output membership functions.

* * * * *